United States Patent
Sugimoto (10) Patent No.: US 9,473,255 B2
(45) Date of Patent: Oct. 18, 2016

(54) WIRELESS COMMUNICATION DEVICE

(71) Applicant: DENSO CORPORATION, Kariya, Aichi-pref. (JP)

(72) Inventor: Yuu Sugimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/653,188

(22) PCT Filed: Nov. 26, 2013

(86) PCT No.: PCT/JP2013/006924
§ 371 (c)(1),
(2) Date: Jun. 17, 2015

(87) PCT Pub. No.: WO2014/097547
PCT Pub. Date: Jun. 26, 2014

(65) Prior Publication Data
US 2015/0333848 A1  Nov. 19, 2015

(30) Foreign Application Priority Data

Dec. 18, 2012 (JP) ................. 2012-275690

(51) Int. Cl.
*H04B 1/38* (2015.01)
*H04B 1/16* (2006.01)
*H04B 15/02* (2006.01)

(52) U.S. Cl.
CPC .......... *H04B 15/02* (2013.01); *H04B 2215/062* (2013.01); *H04B 2215/063* (2013.01); *Y02B 60/50* (2013.01)

(58) Field of Classification Search
CPC ..................................... H04B 15/02
USPC ..................... 455/572, 574, 343.1
See application file for complete search history.

(56) References Cited

U.S. PATENT DOCUMENTS 5,701,597 A     12/1997  Nakanishi et al.
6,172,488 B1 *  1/2001  Mizutani ............... H02J 3/1814
                                                        323/207

(Continued)

FOREIGN PATENT DOCUMENTS

JP    H07307696 A    11/1995
JP    2005175561 A   6/2005

(Continued)

OTHER PUBLICATIONS

International Search Report and Written Opinion (in Japanese with English Translation) for PCT/JP2013/006924, mailed Feb. 18, 2014; ISA/JP.

*Primary Examiner* — Tilahun B Gesesse
(74) *Attorney, Agent, or Firm* — Harness, Dickey & Pierce, P.L.C.

(57) ABSTRACT

A wireless communication device includes: a wireless communication unit that handles a plurality of communication modes; a power supply circuit that transforms a power supply voltage and supply the power supply voltage to the wireless communication unit; a control unit that controls an output voltage of the power supply circuit in accordance with a communication mode; a current fluctuation suppression circuit that suppresses current fluctuation when the wireless communication unit executes burst communication; and a bypass circuit that disconnects a path to bypass the current fluctuation suppression circuit. The control unit controls the bypass circuit in accordance with a communication mode, and provides the bypass path when executing a communication mode without adopting burst communication.

5 Claims, 6 Drawing Sheets

(56) References Cited

U.S. PATENT DOCUMENTS

| | | | |
|---|---|---|---|
| 2004/0155634 A1* | 8/2004 | Sasaki | H01G 9/155 323/263 |
| 2005/0122171 A1 | 6/2005 | Miki et al. | |
| 2006/0223465 A1* | 10/2006 | Akiba | H04W 52/0277 455/127.4 |
| 2008/0197989 A1 | 8/2008 | Kuwabara et al. | |

FOREIGN PATENT DOCUMENTS

| | | |
|---|---|---|
| JP | 2006279577 A | 10/2006 |
| JP | 2008198093 A | 8/2008 |
| JP | 2010118918 A | 5/2010 |

* cited by examiner

WIRELESS COMMUNICATION DEVICE

CROSS REFERENCE TO RELATED APPLICATIONS

This application is a U.S. National Phase Application under 35 U.S.C. 371 of International Application No. PCT/JP2013/006924 filed on Nov. 26, 2013 and published in Japanese as WO 2014/097547 A1 on Jun. 26, 2014. This application is based on and claims the benefit of priority from Japanese Patent Application No. 2012-275690 filed on Dec. 18, 2012. The entire disclosures of all of the above applications are incorporated herein by reference.

TECHNICAL FIELD

The present disclosure relates to a wireless communication device including a wireless communication unit configured to handle a plurality of communication modes, and a power supply circuit for transforming a power supply voltage and supplying the power supply voltage to the wireless communication unit.

BACKGROUND ART

Recently, a model of a cell phone for handling a plurality of communication modes such as a WCDMA (Wideband Code Division Multiple Access (trademark)) mode or a GSM (Global System for Mobile Communication (trademark)) mode has been widely used (for example, see Patent Document 1).

The output states of a signal during communication are different in a WCDMA communication mode and a GSM communication mode. The signal output state of the WCDMA communication system is in a mode where power is consumed constantly, whereas a bursty signal output is repeatedly several times within one frame in a GSM mode. Accordingly, since power supply current also flows intermittently or rapidly in response to the above transmission timing, fluctuation in power supply voltage is caused by the internal resistance of a power supply and the internal resistance of a power supply line.

It is ordinary that a communication device such as a mobile telephone also includes other circuits for driving a microphone and a speaker, a display and LEDs, or the like. When fluctuation in power supply voltage is generated as described above, the fluctuation affects the operation of other circuits. To avoid such circumstances, the configurations for supplying power to a communication circuit through a power supply circuit such as a DC/DC converter have been utilized. However, it is necessary to increase in capacity of a power supply circuit for sufficiently suppressing voltage fluctuation along with the supply of large current, and this leads to cost increase.

Figure 9:
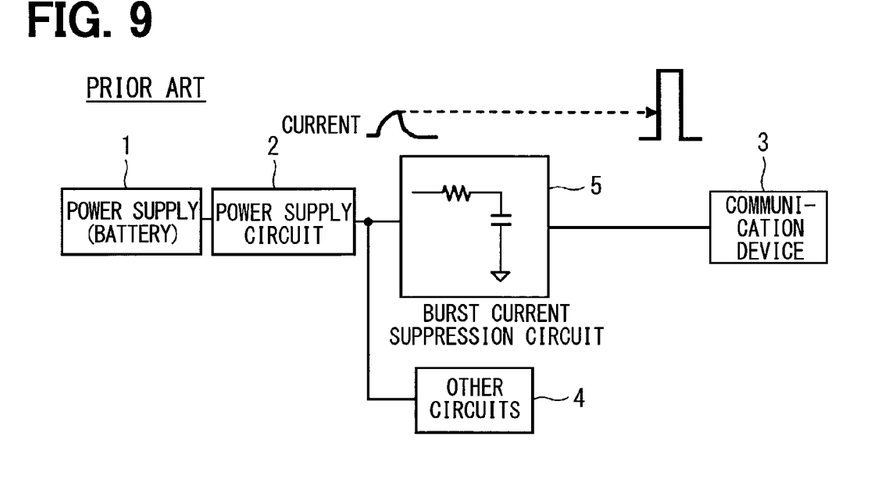
FIG. 9 is a functional block diagram showing a configuration of a wireless communication device for illustrating conventional technology.

It is supposed to use a burst current suppression circuit including a RC-circuit, as shown in FIG. 9, for suppressing fluctuation in power supply voltage without increasing in capacity of a power supply circuit. A power supply (i.e., a battery) 1 supplies power to a communication device 3 and other circuits 4 through a power supply circuit 2; however, the power supply 1 supplies power to the communication device 3 through a burst current suppression circuit 5. By the operation of the burst current suppression circuit 5, the current consumed by the communication device 3 is supplied by an electric charge to be charged in a capacitor 5C, and the charging of the capacitor 5C is performed through a resistor 5R. Therefore, the fluctuation in current at the output side of the power supply circuit 2 is moderated. Accordingly, in a case where the communication device 3 performs communication in a GSM mode, influence caused by voltage fluctuation is reduced on the other circuits 4.

However, when the configuration shown in FIG. 9 is adopted, a voltage drop is produced by the resistor 5R; therefore, it is required to increase output voltage of the power supply circuit 2 accordingly. In addition, current is always consumed by the resistor 5R even in a case where communication is performed in a WCDMA mode, and this leads to an increase in power loss.

PRIOR ART LITERATURES

Patent Literature

Patent Literature 1: JP 2010-118918 A

SUMMARY OF THE INVENTION

The present disclosure aims to provide a wireless communication device that suppresses increase in cost while aiming for higher efficiency of a power supply in a configuration with adopting a plurality of communication modes.

According to an aspect of the present disclosure, a wireless communication device includes: a wireless communication unit that handles a plurality of communication modes; a power supply circuit that transforms a power supply voltage and supplies the power supply voltage to the wireless communication unit; a control unit that controls output voltage of the power supply circuit in accordance with a communication mode executed by the wireless communication unit; a current fluctuation suppression circuit that is arranged for suppressing current fluctuation at an output side of the power supply circuit while the wireless communication unit executes burst communication for executing signal transmission intermittently with adopting one or more communication modes; and a bypass circuit for disconnecting a bypass path which is for bypassing the current fluctuation suppression circuit. The control unit controls the bypass circuit in accordance with a communication mode executed by the wireless communication unit, and provides the bypass path while the wireless communication unit executes a communication mode in which the burst communication is not adopted.

For the wireless communication device, a current fluctuation suppression circuit suppresses current fluctuation at the output side of the power supply circuit while a wireless communication unit executes burst communication. While the wireless communication unit executes a communication mode in which burst communication is not adopted, a path for bypassing the current fluctuation suppression circuit is provided so that power loss in the current fluctuation suppression circuit is avoided. Accordingly, power efficiency is improved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiment 1

Figure 1:
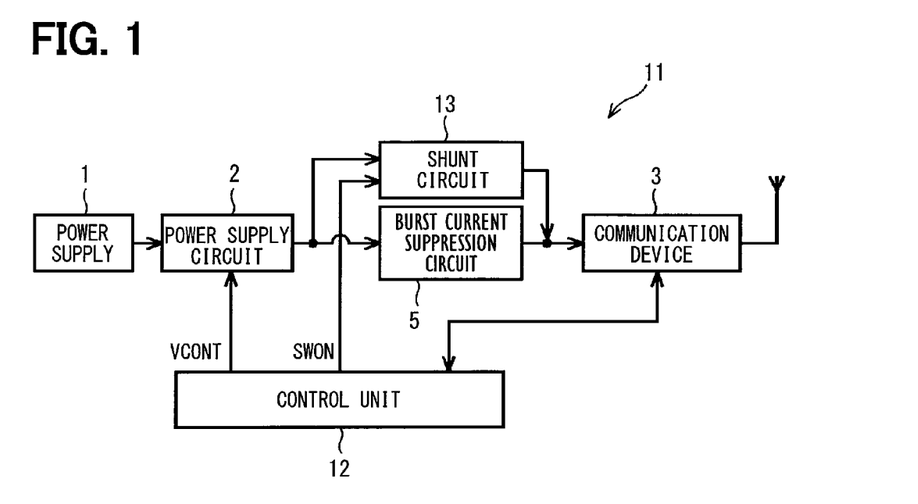
FIG. 1 is a functional block diagram showing a configuration of a wireless communication device, and corresponds to a first embodiment.

The following omits the description of the same parts denoted by the same reference numerals in FIG. 9. The following describes the parts different from the one in FIG. 9. A wireless communication device 11 as, for example, a mobile telephone adds a control unit 12 and a shunt circuit 13 (i.e., a bypass circuit) to the configuration shown in FIG. 9. The shunt circuit 13 is connected in parallel with a burst current suppression circuit 5 (i.e., a current fluctuation suppression circuit or an integrator circuit). The control unit 12 outputs a control signal VCONT for switching the output voltage of the power supply circuit 2. The control unit 12 outputs a control signal SWON for short-circuiting the input and output of the burst current suppression circuit 5 through the shunt circuit 13.

The control unit 12 and a communication device 3 (i.e., a wireless communication unit) performs a command or data transmission/reception through, for example, serial communication. The communication device 3 transmits a command indicating whether a communication mode in execution is, for example, WCDMA or GSM, in accordance with a request of the control unit 12. Or alternatively, the communication device 3 transmits the command periodically.

Figure 3:
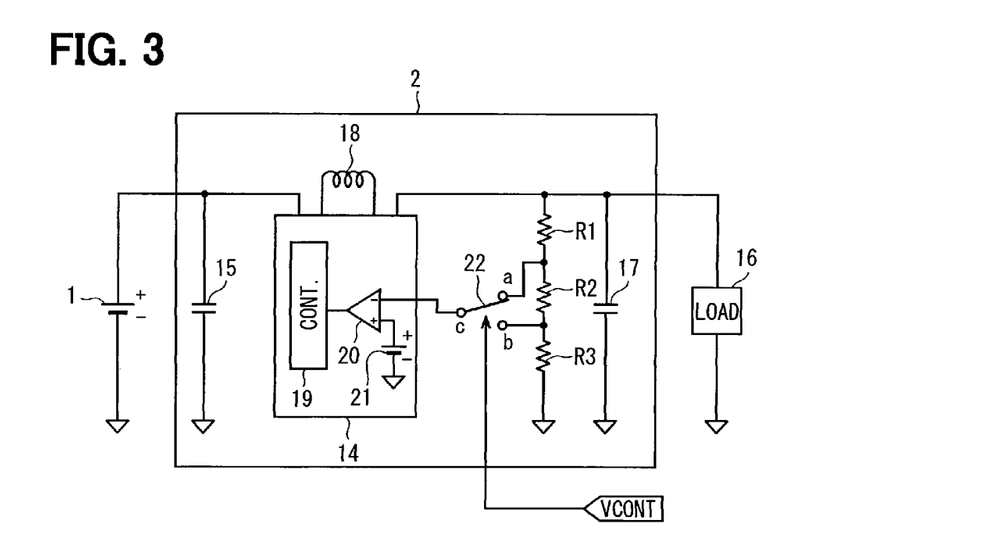
FIG. 3 is a diagram showing a configuration of a power supply circuit.

In FIG. 3, a power supply circuit 2 includes a DC/DC converter 14, and an input terminal of the DC/DC converter 14 is connected to a positive-side terminal of a power supply 1 (for example, an electrical cell or a battery for a vehicle). An input capacitor 15 is connected in parallel with the power supply 1. The DC/DC converter 14 lowers or raises a power supply voltage provided from the power supply 1, and supplies the power supply voltage to a load 16 including the communication device 3 or other circuits 4 illustrated in FIG. 9. The series circuit having an output capacitor 17 and resistors R1 through R3 (i.e., feedback resistance) is connected in parallel with the load 16.

The DC/DC converter 14 includes an inductor 18, a converter control unit (Cont.) 19 for switching control of the electricity to the inductor 18, and an error amplifier 20. A reference voltage 21 is provided to the non-inverting input terminal of the error amplifier 20, and the output terminal of a changeover switch 22 is connected to the inverting input terminal of the error amplifier 20. The changeover switch 22 has input terminals a, b, which are respectively connected to a common connection point of the resistors R1 and R2 and a common connection point of the resistors R2 and R3. The changeover switch 22 switches the output terminal c so as to connect any of the input terminals a, b in response to a control signal VCONT outputted by the control unit 12. The converter control unit 19 not shown is configured to include, for example, a switching element such as a FET or a circuit for controlling switching of the element.

Figure 2:
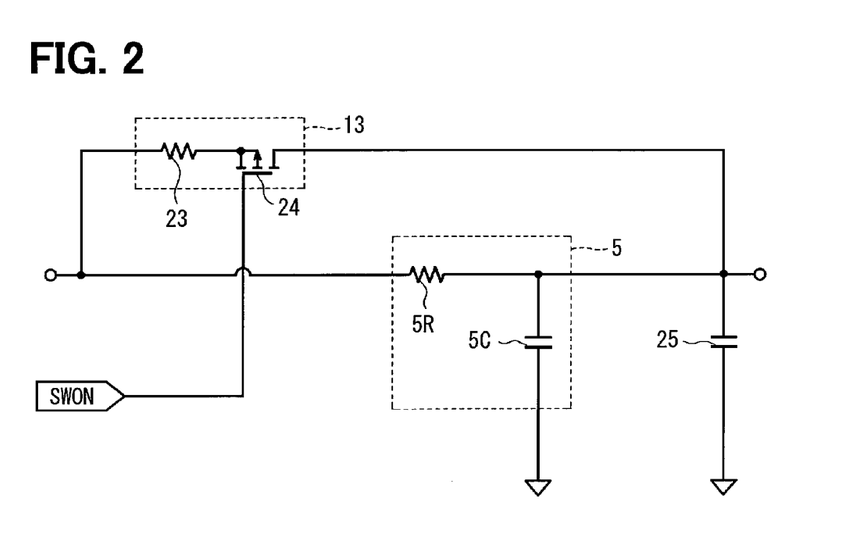
FIG. 2 is a diagram showing particular configurations of a burst current suppression circuit and a short circuit.

In FIG. 2, the shunt circuit 13 is configured by a series circuit including a resistor 23 and a p-channel MOSFET 24 for current suppression. The resistor 23 has one end which is connected to the input side of the burst current suppression circuit 5, and the drain of the p-channel MOSFET 24 is connected to the output side of the burst current suppression circuit 5. A control signal SWON outputted from the control unit 12 is provided to the gate of the p-channel MOSFET 24. A capacitor 25, which is connected to the output side of the burst current suppression circuit 5, stabilizes the power supply to be inputted to the communication device 3.

Figure 4A:
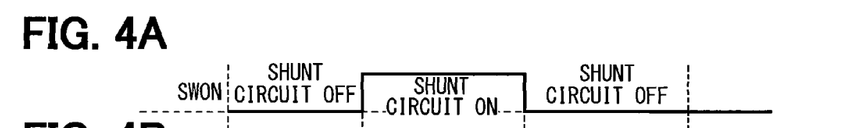
FIGS. 4A through 4E are diagrams showing control sequence.
Figures 4B, 4C:
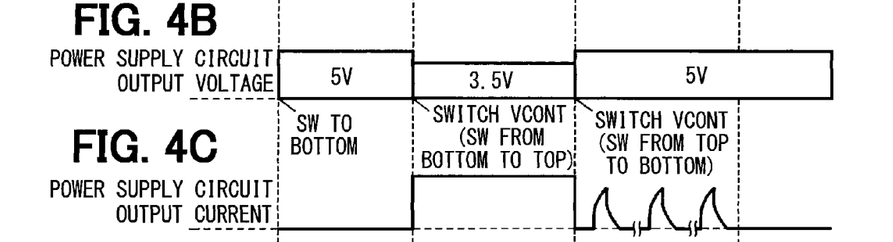
Figure 4D:
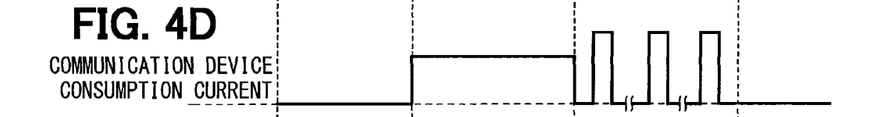
Figure 4E:
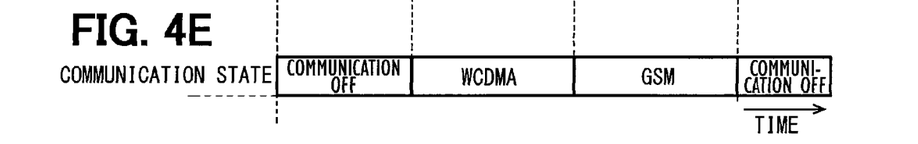

The operation carried out by the present embodiment is illustrated with reference to FIG. 4 in the following. When the communication state of the communication device 3 is OFF as shown in FIG. 4E, the control unit 12 sets the control signal SWON at a high level, switches the shunt circuit 13 to an OFF state (see FIG. 4A), and disconnects a path which is for bypassing the burst current suppression circuit 5. In addition, the output terminal c of the changeover switch 22 is connected to the input terminal b (see FIG. 4B). At this time, the resistance values of the resistors R1 through R3 and the reference voltage 21 are set so that the output voltage of the power supply circuit 2 is at 5V.

When the communication device 3 performs communication through WCDMA, the control unit 12 sets the control signal SWON at a low level and switches the shunt circuit 13 to an ON state, and connects a bypass path of the burst current suppression circuit 5. In addition, the output terminal c of the changeover switch 22 is switched so as to connect the input terminal a. At this time, the output voltage of the power supply circuit 2 is set at 3.5V. For example, when the reference voltage 21 is 0.8V, the output voltage corresponds to $0.8V \times \{1+R1/(R2+R3)\}$. With regard to communication through WCDMA, the current consumption of the communication device 3 is substantially constant (see FIG. 4D), and the current consumption of the power supply circuit 2 is also substantially constant accordingly (see FIG. 4C). In this case, the power outputted from the power supply circuit 2 is supplied to the communication device 3 by bypassing the burst current suppression circuit 5; and therefore, the unnecessary power consumption through the resistor 5R is avoided.

On the other hand, when the communication device 3 performs communication through GSM, the control unit 12 sets the shunt circuit 13 to an OFF state, and switches the changeover switch 22 so as to connect the output terminal c to the input terminal b. It is noted that the output voltage of the power supply circuit 2 at this time is set at 5V so that voltage drop across the resistor R5 is expected to be 1.5V for maintaining a power supply voltage at 3.5 V to be supplied to the communication device 3.

The transmission in a GSM mode corresponds to the so-called burst communication in which communication including 8 slots within one communication frame is performed. Accordingly, the consumption current of the communication device 3 flows intermittently and rapidly in accordance with timing in which transmission is performed (i.e., burst current), and changes into a rectangular waveform as shown in FIG. 4D. Since the current waveform at the output side of the power supply power supply circuit 2 is distorted as shown in FIG. 4C due to the operation of the burst current suppression circuit 5, rapid fluctuation is moderated. It is noted that the resistance value of the resistor 5R and the capacitance value of the capacitor 5C for constituting the burst current suppression circuit 5 may be properly determined in accordance with a peak value of burst current or an acceptable voltage drop in the burst current suppression circuit 5. Even if the transmission in a GSM mode is completed and the communication state is in an OFF state, the control unit 12 maintains a control state corresponding to GSM.

According to the present embodiment as described above, when the communication device 3 performs burst communication in a GSM communication mode, the burst current suppression circuit 5 is arranged for suppressing current fluctuation at the output side of the power supply circuit 2, and the shunt circuit 13 is arranged for disconnecting a path which is for bypassing the burst current suppression circuit 5. The control unit 12 controls the shunt circuit 13 so as to form a bypass path when the communication device 3 executes a WCDMA communication mode without adopting burst communication.

Therefore, the current fluctuation at the output side of the power supply circuit 2 is suppressed while the communication device 3 performs burst communication in a GSM mode, and power loss in the burst current suppression circuit 5 is avoided while the communication device 3 performs communication in a WCDMA mode without adopting burst communication. Accordingly, the power efficiency can be improved. In addition, the burst current suppression circuit 5 is configured as an integrator circuit including the resistor 5R and the capacitor 5C; and therefore, the current fluctuation at the output side of the power supply circuit 2 made by a simple configuration is suppressed.

Embodiment 2

Figure 5:
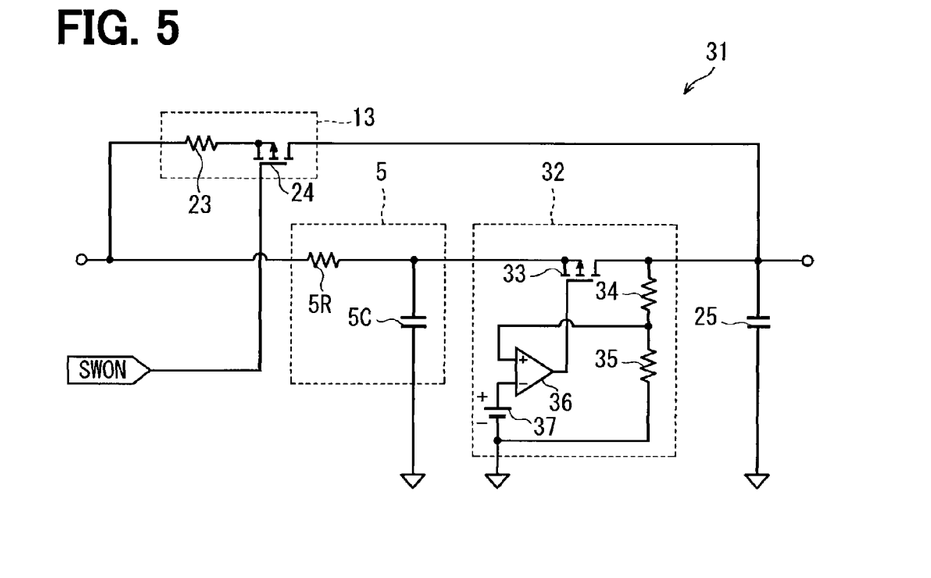
FIG. 5 is a diagram showing particular configurations of a burst current suppression circuit and a short circuit for illustrating a second embodiment.

The following omits the description of the same parts denoted by the same reference numerals in Embodiment 1. The following describes the parts different from the one in Embodiment 1. A wireless communication device 31 shown in FIG. 5 is configured by arranging a series power supply circuit 32 (i.e., a step-down power supply circuit) between a burst current suppression circuit 5 and a communication device 3. A p-channel MOSFET 33 is inserted into a power supply line. A series circuit including resistors 34 and 35 is connected between the drain of the p-channel MOSFET 33 and ground. The non-inverting input terminal of an operational amplifier 36 connects the common connection point of the resistors 34 and 35, and a reference voltage 37 is provided to the inverting input terminal of the operational amplifier 36. The output terminal of the operational amplifier 36 is connected to the gate of the p-channel MOSFET 33.

Thus, with the arrangement of the series power circuit 32, the power supply voltage supplied to the communication device 3 is smoothened when the voltage drop across the burst current suppression circuit 5 is relatively larger. Alternatively, when the operating voltage of the communication device 3 is set relatively lower than the operation voltage of the other circuits 4, the power supply voltage is adjusted to be lower due to the series power supply circuit 32.

According to the Embodiment 2 configured as described above, since the series power supply circuit 32 is arranged between the burst current suppression circuit 5 and the communication device 3, the power supply voltage supplied to the communication device 3 is smoothened, and the operation voltage of the other circuits 4 and the operation voltage across the communication device 3 are individually adjusted at a proper level. In addition, since the shunt circuit 13 is connected so as to bypass the series power supply circuit 32, the power outputted by the power supply circuit 2 can be directly supplied to the communication device 3 in a case where it is not necessary to operate the series power supply circuit 32 when there is no voltage drop across the burst current suppression circuit 5.

Embodiment 3

Figure 6:
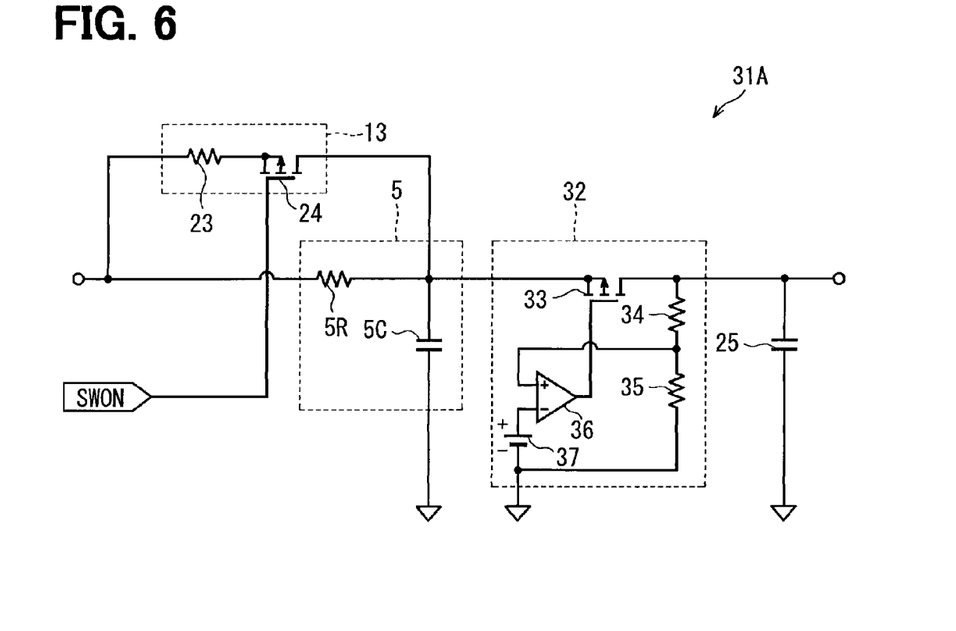
FIG. 6 is a diagram showing particular configurations of a burst current suppression circuit and a short circuit for illustrating a third embodiment.

According to Embodiment 3 as shown in FIG. 6, a shunt circuit 13 is connected in parallel with only a burst current suppression circuit 5. Accordingly, Embodiment 3 is able to manage operating a series power supply circuit 32 as required even if there is no voltage drop across the burst current suppression circuit 5.

Embodiment 4

Figure 7:
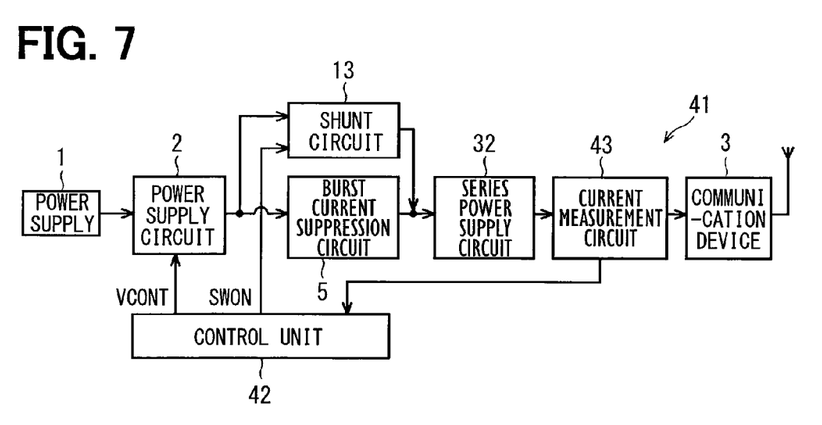
FIG. 7 is a functional block diagram showing a configuration of a wireless communication device for illustrating a fourth embodiment.

A wireless communication device 41 shown in FIG. 7 does not perform communication for notifying of a communication mode in execution as in Embodiment 1 to a control unit 42 substituting for a communication device 3 and a control unit 12. However, the communication in which the control unit 42 controls the communication device 3 is performed. A current measurement circuit 43 (i.e., a current detection circuit) is arranged between a burst current suppression circuit 5 and a communication device 3. The control unit 42 determines a communication mode executed by the communication device 3 in accordance with a conduction state to the communication device 3 measured by the current measurement circuit 43.

Figure 8:
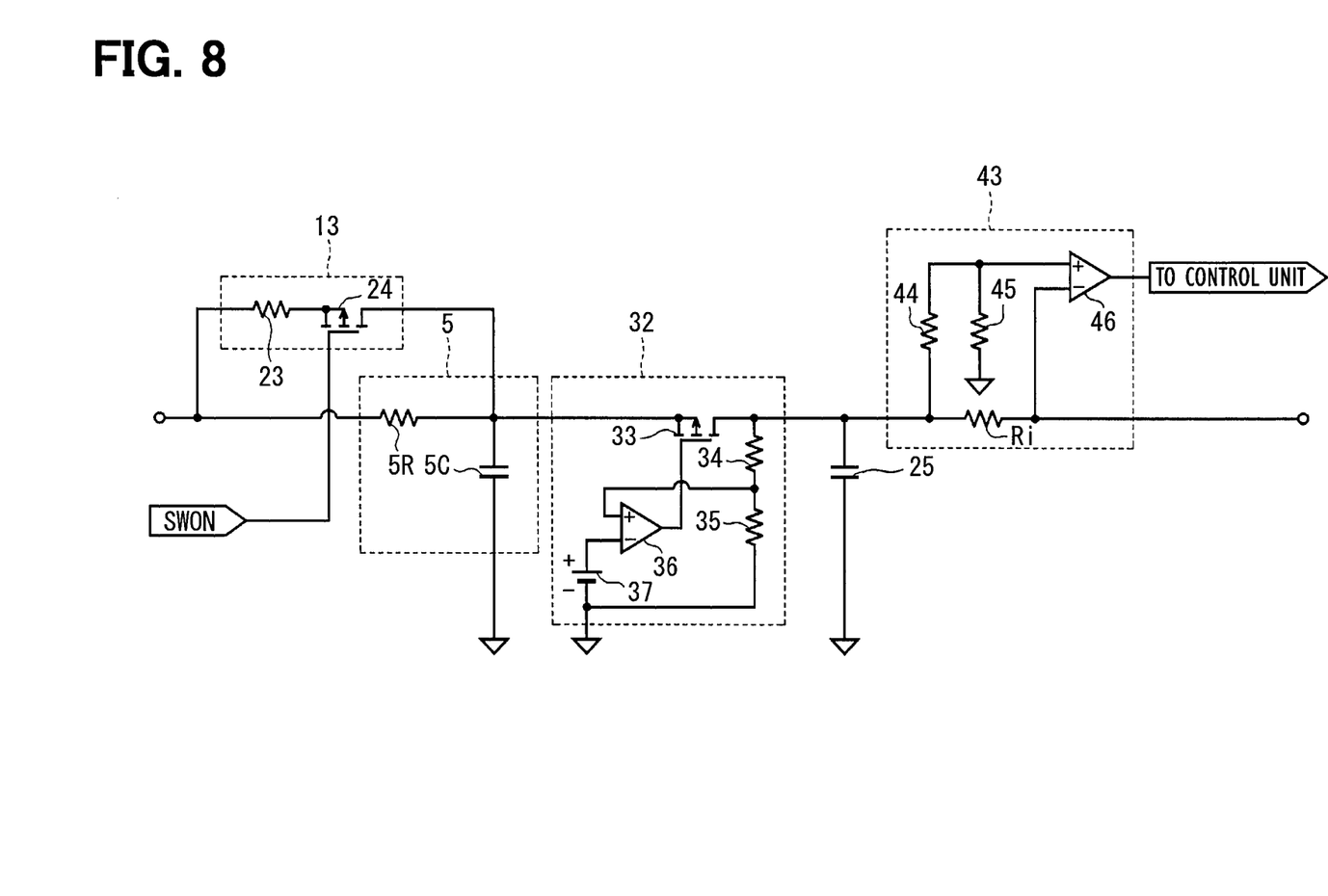
FIG. 8 is a diagram showing particular configurations of a burst current suppression circuit and a short circuit.

As shown in FIG. 8, a resistor Ri is inserted in a power supply line, a series circuit including resistors 44 and 45 between the input terminal side of the resistor Ri (i.e., the side of a series power supply circuit 32) and ground. The output terminal of the resistor Ri is connected to the inverting input terminal of a comparator 46, and the non-inverting input terminal of the comparator 46 is connected to the common connection point of the resistors 44 and 45. The output terminal of the comparator 46 is connected to the input terminal of the control unit 42. The above components constitute the current measurement circuit 43.

The operation performed by Embodiment 4 is described below. When the communication device 3 performs WCDMA communication and the consumption current of the communication device 3 is relatively smaller, the electric potential at the inverting input terminal of the comparator 46 gets larger than a threshold voltage provided to the non-inverting input terminal. Accordingly, the current measurement circuit 43 outputs a low-level signal to the control unit 42. On the other hand, when the communication device 3 performs GSM communication, and the consumption current of the communication device 3 gets larger, the voltage at the inverting input terminal of the comparator 46 gets smaller than a threshold voltage. Thus, the current measurement circuit 43 outputs a high-level signal to the control unit 42 (only at transmission timing in burst communication).

One frame of communication in a GSM mode is 4.6 milliseconds. Accordingly, the control unit 42 recognizes that the communication device 3 performs GSM communication by determining that the output signal level of the current measurement circuit 43 is alternatively repeated to be at a high level or low level within a period of one frame, and is configured to switch the output voltage of the power supply circuit 2 and the shunt circuit 13 to be on and off.

According to Embodiment 4 as described above, the current measurement circuit 43 for detecting current flowed into a power supply line is provided between the burst current suppression circuit 5 and the communication device 3, and the control unit 42 determines a communication mode executed by the communication device 3 in response to a conduction state of current detected by the current measurement circuit 43, and controls the shunt circuit 13. Accordingly, when comparing to the configuration in which the communication device 3 transfers an executing communication mode to the control unit 12 as, for example, in Embodiment 1, the control unit 42 is capable of detecting the changing of a communication mode relatively faster.

The communication device 3 and the control unit 12 are not necessarily required to perform communication. For example, the communication device 3 outputs a binary signal to the control unit 12, and may indicate a communication mode being switched according to a change (i.e., high or low) in the signal.

In Embodiment 4, the communication between the communication device 3 and the control unit 42 is performed as similar to Embodiment 1. Embodiment 4 indicates that communication in a GSM mode specified by the communication device 3 is in execution, and may switch a communication mode by changing the output signal level of the current measurement circuit 43 as described above.

According to Embodiment 4, the series power supply circuit 32 may be removed.

As the operating voltage of the communication device 3 or the voltage drop across the shunt circuit 13 varies with individual design, the output voltage of the power supply circuit 2 may be properly configured according to the operational voltage of the communication device 3 or the voltage drop across the shunt circuit 13.

As a current variation suppression circuit is able to restrict fluctuation in output voltage of the power supply circuit 2, the circuit may not be restricted to an integrator circuit.

A communication device may handle three or more communication modes.

A bipolar transistor may be used for substituting a MOSFET.

The particular configuration for a current detection circuit is not restricted to the current measurement circuit 43.

A communication mode is not restricted to WCDMA and GSM. At least one or more communication modes may perform burst communication.

A wireless communication device is not restricted to a mobile telephone.

While the present disclosure has been described with reference to embodiments thereof, it is to be understood that the disclosure is not limited to the embodiments and constrictions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A wireless communication device, comprising:
   a wireless communication unit that handles a plurality of communication modes;
   a power supply circuit that transforms a power supply voltage and supplies the power supply voltage to the wireless communication unit;
   a control unit that controls an output voltage of the power supply circuit in accordance with a communication mode executed by the wireless communication unit;
   a current fluctuation suppression circuit that is arranged for suppressing current fluctuation at an output side of the power supply circuit when the wireless communication unit executes burst communication for intermittently and repeatedly executing transmission of a signal, with use of one or more of the communication modes; and
   a bypass circuit that disconnects a bypass path for bypassing the current fluctuation suppression circuit,
   wherein the control unit controls the bypass circuit in accordance with the communication mode executed by the wireless communication unit, and provides the bypass path when the wireless communication unit executes a communication mode without utilizing the burst communication.

2. The wireless communication device according to claim 1,
   wherein the current fluctuation suppression circuit is configured by an integrator circuit.

3. The wireless communication device according to claim 1, further comprising:
   a step-down power supply circuit arranged between the current fluctuation suppression circuit and the wireless communication unit.

4. The wireless communication device according to claim 3,
   wherein the bypass circuit provides the bypass path so as to bypass the step-down power supply circuit.

5. The wireless communication device according to claim 1, further comprising:
   a current detection circuit that detects current flowing in a power supply line between the current fluctuation suppression circuit and the wireless communication unit,
   wherein the control unit controls the bypass circuit in response to a conduction state of current detected by the current detection circuit.

* * * * *